July 18, 1950     M. D. BRANE     2,515,982
DYNAMIC BRAKING SYSTEM
Filed March 8, 1947
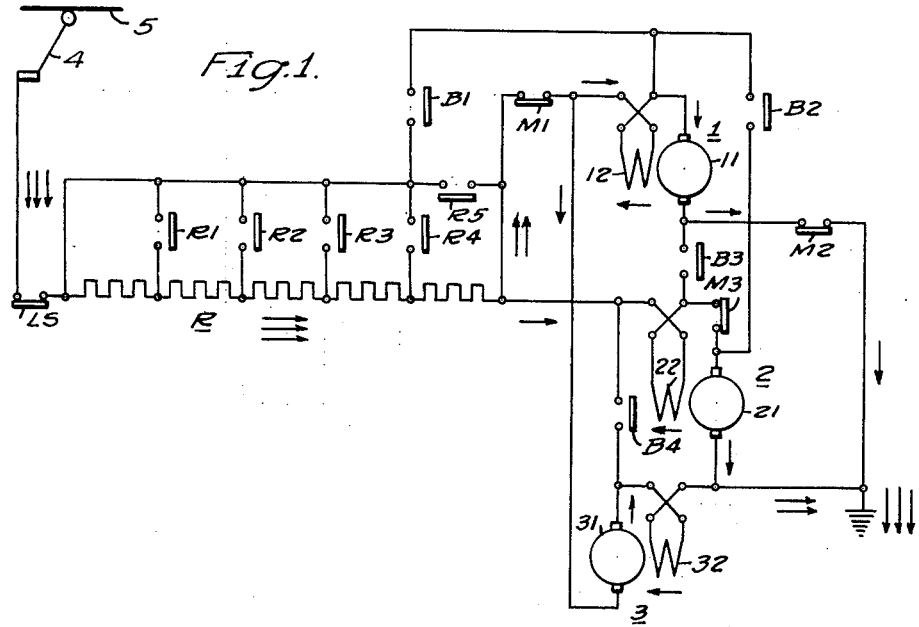
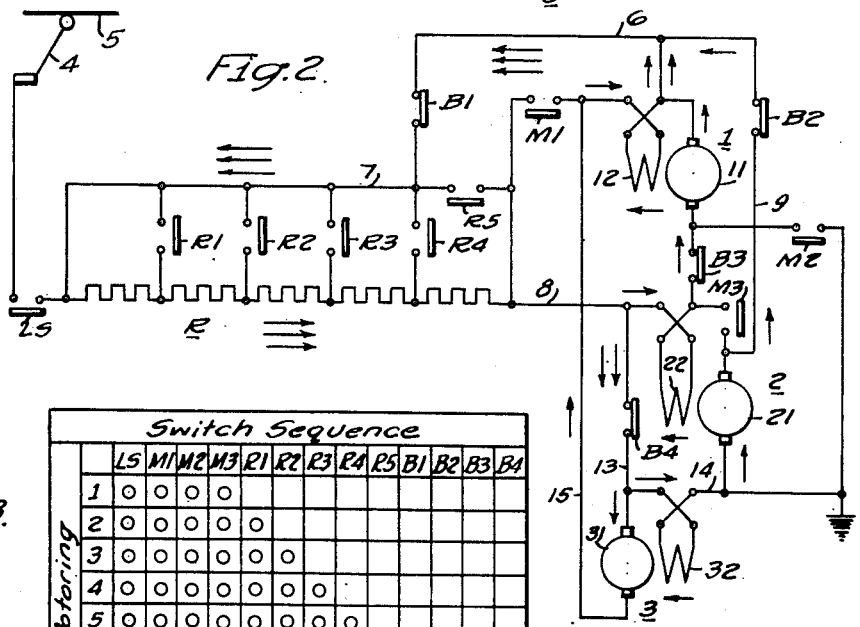
WITNESSES:
INVENTOR
Maxwell D. Brane.
BY
ATTORNEY Patented July 18, 1950

2,515,982

UNITED STATES PATENT OFFICE 2,515,982

DYNAMIC BRAKING SYSTEM

Maxwell D. Brane, Wexford, Pa., assignor to Westinghouse Electric Corporation, East Pittsburgh, Pa., a corporation of Pennsylvania Application March 8, 1947, Serial No. 733,362

5 Claims. (Cl. 318—63)

My invention relates, generally, to control systems and, more particularly, to systems for controlling the dynamic braking of the propelling motors of electric vehicles, such as mining locomotives and the like.

The copending application of L. G. Riley, Serial No. 667,760, filed May 7, 1946, discloses a system for securing equal dynamic braking effects from the motors of a three-motor locomotive. In the foregoing system, resistors are required to so balance the circuit that the braking effort is divided evenly between the three motors. Since the resistance of the motor field coils increases with temperature, it is impossible to design an external resistor which will exactly match the resistance of a motor series field winding over the entire range of operating temperatures. Therefore, it is considered necessary to adjust the resistance under actual operating conditions to secure the best results.

An object of my invention, generally stated, is to provide a control system which shall be simple and efficient in operation and which may be economically manufactured and installed.

A more specific object of my invention is to secure equal dynamic braking effects from the motors of a three-motor locomotive without requiring balancing resistance in the dynamic braking circuit.

Other objects of my invention will be explained fully hereinafter or will be apparent to those skilled in the art.

In accordance with one embodiment of my invention, three motors of the series type are so connected in a dynamic braking circuit that the circuit is balanced and stabilized without the use of balancing resistors by forcing the current from the armature of each motor through the series field of another motor.

For a fuller understanding of the nature and objects of my invention, reference may be had to the following detailed description, taken in conjunction with the accompanying drawing, in which:

Figure 1 is a diagrammatic view of a control system embodying the principal features of my invention and showing the power or accelerating circuits for the motors;

Fig. 2 is a view, similar to Fig. 1, showing the dynamic braking circuits for the motors, and Fig. 3 is a chart showing the sequence of operation of the apparatus illustrated in Figs. 1 and 2.

Referring to the drawing, and particularly to Fig. 1, the system shown therein controls the acceleration of three motors, 1, 2, and 3 which may be of the series type suitable for propelling an electric vehicle, such as a mining locomotive (not shown). The motor 1 has an armature winding 11 and a series field winding 12. The motor 2 has an armature winding 21 and a series field winding 22. Likewise the motor 3 has an armature winding 31 and a series field winding 32. The power for operating the motor may be supplied through a current collector 4, which engages a trolley conductor 5. The trolley conductor may be energized from any suitable source of power, such as a power generating station (not shown).

The motors may be connected to the power source in parallel-circuit relation by means of switches LS, M1, M2, and M3. A resistor R is provided for controlling the motor current during both acceleration and deceleration of the motors. Resistor shunting switches R1, R2, R3, R4, and R5 are provided for shunting the resistor R step-by-step in a manner well known in the art. The resistor shunting switches are closed in sequential relation, as indicated by the sequence chart in Fig. 3.

When the motors are connected to the power source by closing the switches LS, M1, M2 and M3 the current flows through the motors in substantially equal amounts, as indicated by the arrows in Fig. 1. It will be noted that the current for all three motors flows through the resistor R when the motors are first connected to the power source. The resistor R is then shunted from the motor circuit step-by-step by closing the resistor shunting switches R1 to R5, inclusive, as indicated in the sequence chart.

When it is desired to decelerate the vehicle by means of dynamic braking, the switches LS, M1, M2, and M3 are opened and switches B1, B2, B3, and B4 are closed, thereby establishing dynamic braking connections for the motors. As indicated by the arrows in Fig. 2, the dynamic braking connections are such that the current from the armature of each motor is forced through the field winding of another motor. Thus, the field winding of each motor is excited by the current generated in the armature winding of another motor, thereby balancing and stabilizing the circuit without the use of external balancing resistors.

As indicated by the arrows, current flows from one terminal of the armature 11 of the motor 1 through conductor 6, the switch B1, conductor 7, the resistor R, conductor 8, the series field winding 22 of the motor 2, and the switch B3 to the other terminal of the armature winding 11. At the same time, current flows from one terminal of the armature winding 21 of the motor 2 through conductor 9, the switch B2, conductor 6, the switch B1, conductor 7, the resistor R, conductor 8, the switch B4, conductor 13, the series field winding 32 of the motor 3, and conductor 14 to the other terminal of the armature winding 21. Likewise, current flows from one terminal of the armature 31 of the motor 3 through conductor 15, the series field winding 12 of the motor 1, conductor 6, switch B1, conductor 7, the resistor R, conductor 8, the switch B4 and conductor 13 to the other terminal of the armature winding 31.

It will be seen that the current from all of the motors flows through the resistor R. Furthermore, the current from the armature winding of each motor flows through the field winding of another motor. Therefore, since all three motors are subjected to the same braking voltage and regulation, they produce substantially equal braking effects.

The resistor shunting switches R1 to R5 are closed in sequential relation during dynamic braking in the same manner as during acceleration, as indicated by the sequence chart in Fig. 3. In this manner, dynamic braking is obtained without it being necessary to operate the reversing switches for the motors when changing from power operation to dynamic braking. Furthermore, the dynamic braking circuit is balanced and stabilized without the use of external balancing resistors.

From the foregoing description, it is apparent that I have provided a dynamic braking system which makes it possible to utilize dynamic braking on a locomotive having three motors, without requiring the utilization of external balancing resistors and, therefore, without adjustment of the balancing resistors under actual operating conditions. The motor connections in the present system are such that it is impossible for bucking circuits to be set up when a locomotive is being towed by another locomotive.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, three motors, each motor having an armature winding and a series field winding, a reversing switch for each motor, switching means for connecting the motors in parallel-circuit relation to accelerate the motors, and additional switching means for establishing dynamic braking circuit connections for the motors and being operable independently of operation of said reversing switches, said dynamic braking circuit connections being such that the series field winding of each motor is excited by the current generated by another one of said motors.

2. In a control system, in combination, three motors, each motor having an armature winding and a series field winding, a reversing switch for each motor, switching means for connecting the motors in parallel-circuit relation to accelerate the motors, additional switching means for establishing dynamic braking circuit connections for the motors and being operable independently of operation of said reversing switches, said dynamic braking circuit connections being such that the series field winding of each motor is excited by the current generated by another one of said motors, and a resistor for controlling the current generated by all of said motors.

3. In a control system, in combination, three motors, each motor having an armature winding and a series field winding, a reversing switch for each motor, switching means for connecting the motors in parallel-circuit relation to accelerate the motors, and additional switching means for establishing dynamic braking circuit connections for the motors and being operable independently of operation of said reversing switches, said dynamic braking circuit connections being such that the series field winding of each motor is excited by the current generated by another one of said motors, a resistor for controlling the current generated by all of said motors, and means for shunting said resistor step-by-step.

4. In a control system, in combination, three motors, each motor having an armature winding and a series field winding, a reversing switch for each motor, switching means for connecting the motors in parallel-circuit relation to accelerate the motors, additional switching means for establishing dynamic braking circuit connections for the motors and being operable independently of operation of said reversing switches, said dynamic braking circuit connections being such that the series field winding of each motor is excited by the current generated by another one of said motors, and a resistor for controlling the current in all of said motors during both acceleration and dynamic braking.

5. In a control system, in combination, three motors, each motor having an armature winding and a series field winding, a reversing switch for each motor, switching means for connecting the motors in parallel-circuit relation to accelerate the motors, additional switching means for establishing dynamic braking circuit connections for the motors and being operable independently of operation of said reversing switches, said dynamic braking circuit connections being such that the series field winding of each motor is excited by the current generated by another one of said motors, a resistor for controlling the current in all of said motors during both acceleration and dynamic braking, and means for shunting said resistor step-by-step.

MAXWELL D. BRANE.

REFERENCES CITED

The following references are of record in the file of this patent:

UNITED STATES PATENTS

| Number | Name | Date |
| --- | --- | --- |
| Re. 14,861 | Wright | May 18, 1920 |
| 1,317,266 | Candee et al. | Sept. 30, 1919 |